United States Patent

Bachner

[11] 3,971,300
[45] July 27, 1976

[54] APPARATUS FOR ULTRASONIC SEALING OF NON-UNIFORM FOLDED CARTON BOTTOM CLOSURE

[75] Inventor: George L. Bachner, Barrington, Ill.

[73] Assignee: Nimco Corporation, Crystal Lake, Ill.

[22] Filed: Apr. 25, 1975

[21] Appl. No.: 570,544

[52] U.S. Cl. .............................. 93/36.3; 93/59 R; 93/36.8; 93/39.1 R; 53/387; 229/37 R
[51] Int. Cl.² ........................................ B31B 1/28
[58] Field of Search ............ 93/36 R, 36.3, 59, 36.8, 93/39.1 R, 44.1 R, 46, 47, 50; 53/387; 229/37 R; 251/58 R

[56] References Cited
UNITED STATES PATENTS

| | | | |
|---|---|---|---|
| 3,252,386 | 5/1966 | Reimers | 93/44.1 R |
| 3,422,730 | 1/1969 | Mitzelfelt et al. | 93/36.3 UX |
| 3,555,975 | 1/1971 | Barnes | 93/59 R X |

*Primary Examiner*—Willie G. Abercrombie

[57] ABSTRACT

Apparatus is disclosed for use with a conventional bottom closure folding machine for ultrasonically sealing folded carton bottom closures having at least two differing thicknesses or laminates comprising, in part, a unique sealing horn and multi-surface mandrel pad arrangement which makes possible the ultrasonic sealing of a laminated bottom closure of varying thicknesses for a container composed of thermoplastic double coated foldable material such as, for example, a polyethylene double coated paperboard carton. The sealing horn comprises a substantially conventional body portion surmounted by a face having a recessed portion and a raised portion for forcibly engaging the folded carton bottom closure and forming an ultrasonic seal at predetermined critical areas of the bottom closure. The multi-surface mandrel pad has a multiplicity of surfaces which lie in at least two distinct planes and which are shaped to receive and engage sections of tabs and panels of the folded carton bottom closure so that when the sealing horn and multisurface mandrel pad are forcibly urged together, the force exerted on the folded carton bottom closure over the area of contact between the face portion of the sealing horn and the surface of the folded carton bottom closure is substantially uniform. The multi-surface mandrel pad, through its multiplicity of surfaces, receives and engages sections of tabs and panels of the infolded surface of the folded carton bottom closure during sealing thereby preventing excessive vibration of those portions of the carton bottom closure which are not in forcible engagement with the raised portion of the sealing horn face during sealing thereby avoiding unwanted "burn through".

31 Claims, 16 Drawing Figures

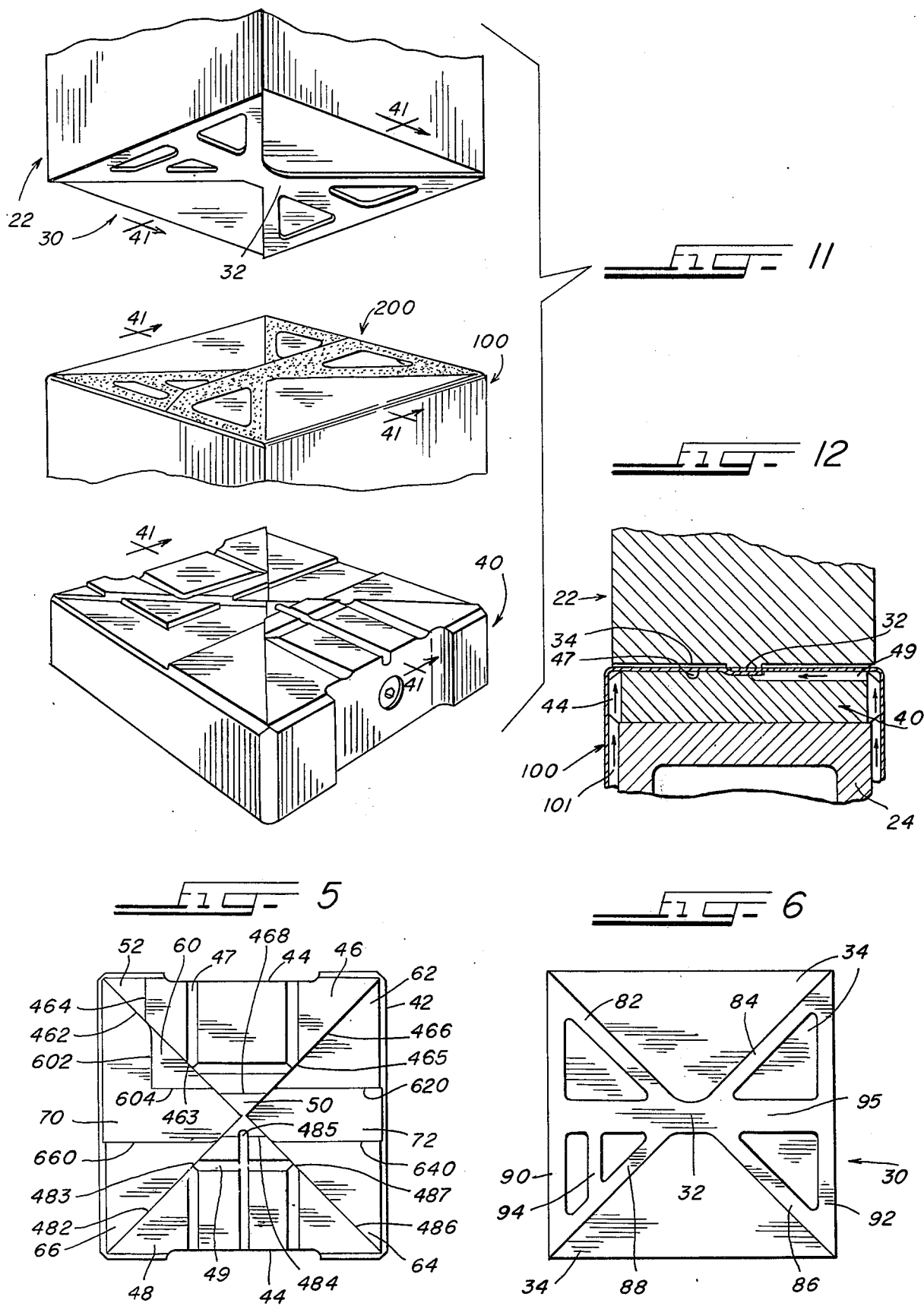

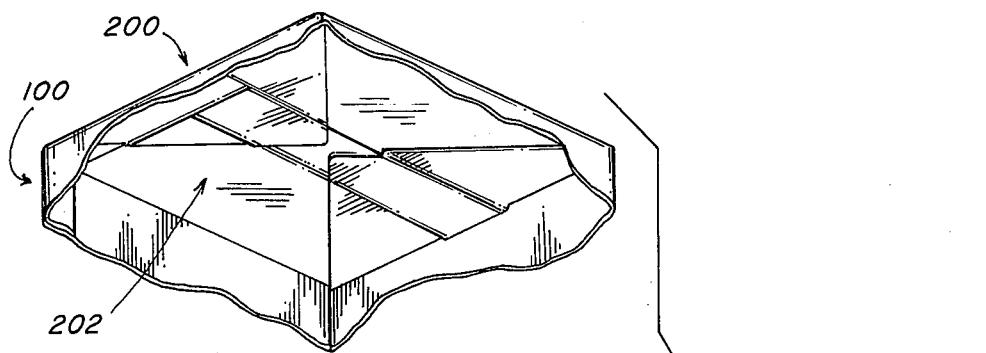
FIG-14
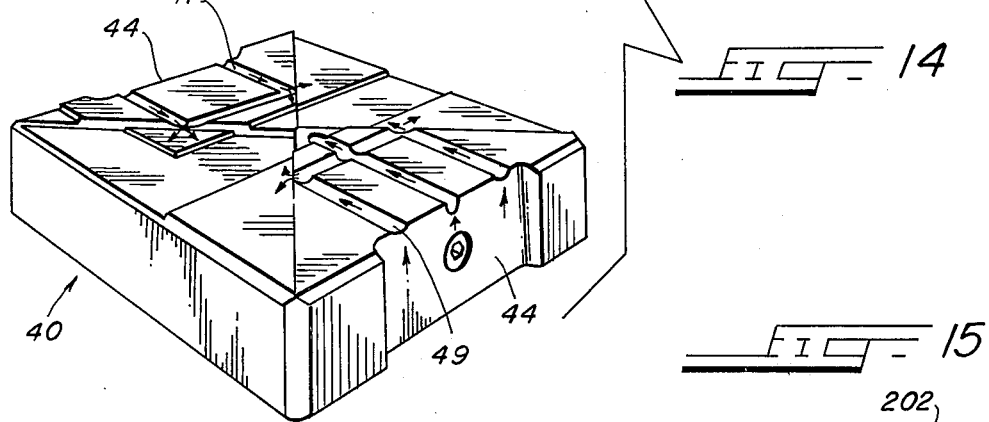
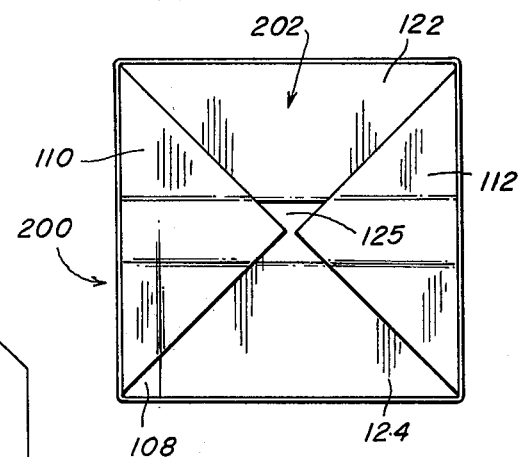
FIG-15
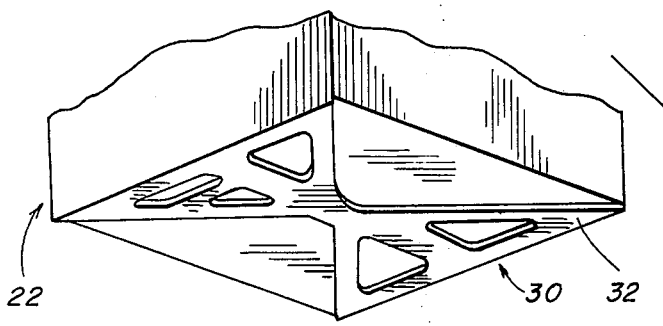
FIG-13
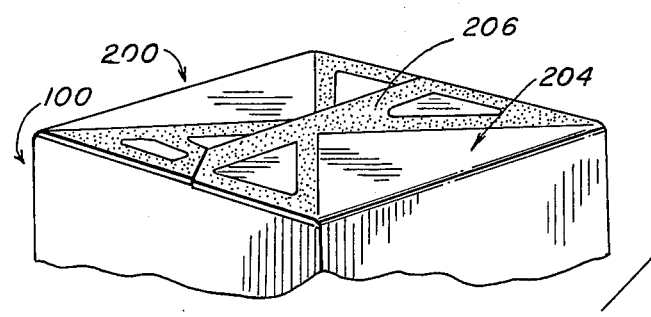
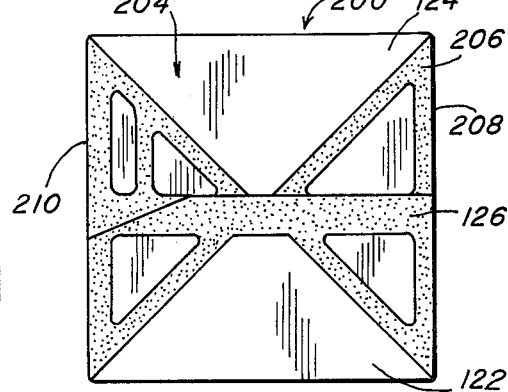
FIG-16

APPARATUS FOR ULTRASONIC SEALING OF NON-UNIFORM FOLDED CARTON BOTTOM CLOSURE

BACKGROUND OF THE INVENTION

1. Field of the Invention

This invention generally relates to apparatus for closing containers and more particularly to the liquid-tight ultrasonic sealing of bottom closures of cartons composed of foldable material double coated with thermoplastic, examples of which are polyethylene double coated paperboard containers used for the packaging of milk and other dairy products.

2. Description of the Prior Art

Over the past three decades the packaging industry has witnessed revolutionizing changes in the art. In the milk packaging industry, the industry in which the present invention is likely to find its greatest application, containers have evolved from returnable glass bottles—to wax coated paperboard—to paperboard containers coated with thermoplastic. Carbon blanks for the latter type cartons are customarily cut and scored for folding and joined along appropriate edges with a liquid tight side seam by paper companies to form a collapsed tube of material whereafter the carton blanks are supplied to milk packagers in a collapsed or flat form. Final packaging generally requires expanding the carton blank to its tubular shape, forming a liquid-tight closure at the carbon bottom, filling the carton, and thereafter closing the carton top with a liquid tight seal such as, for example, the conventional gable top pour spout closure.

The prior art which is most germane to the present invention is that which relates to apparatus for forming carton bottom closures with liquid-tight seals. In the case of thermoplastic double coated paperboard containers, the panels and tabs of the bottom closures, being defined by the carton blank profile and scoring patterns, are conventionally subjected to gas or electric radiant heat or superheated blown air which activates the thermoplastic double coating. Thereafter the carton bottom closure is folded into, and held under pressure in, its closed position until the activated thermoplastic is cooled to its solid state forming a liquid-tight seal between adjoining carton bottom panels and tabs. Exemplary conventional folding and sealing techniques for top and bottom closures are disclosed in U.S. Pat. No. 3,120,335 to Engleston et al. and U.S. Pat. No. 3,120,333 to Seiple.

Prior art gas and electric radiant heat and superheated blown air sealing techniques have long been recognized as objectionable because, among other reasons, it is difficult with such techniques to maintain consistency of heat distribution and to control the activation of the thermoplastic in the sealing process. In addition, the packaging area of the plant is often overheated during the sealing process to an uncomfortable level and such heat poses continuous fire hazards.

To eliminate the above-noted shortcomings ultrasonic sealing techniques have been developed with some success. For example, there have been breakthroughs in the art which now make it possible to ultrasonically seal the carton top closure thereby avoiding the need for gas or electric radiant heat and superheated blown air in all packaging steps after carton bottom closure. An example of the ultrasonic top closure technique is disclosed in U.S. Pat. No. 3,486,731 to Obeda. There have been some developments and experimentations with respect to the use of ultrasonic techniques for joining laminates of varying thicknesses by the use of contour surfaces on ultrasonic sealing apparatus. One such development is described in German Pat. application DAS No. 2165620. However, these techniques have heretofore been unsatisfactory for use in carton bottom closure sealing because of the difficulties, including uncontrolled "burn through", presented by the sealing of a closure on a tubular container, particularly when the closure comprises a multiplicity of laminated surfaces of varying thicknesses and complex shapes and sections of the closure are not included in the ultrasonic seal pattern.

Thus, it would be a desirable advance in the art to provide apparatus to overcome heretofore encountered difficulties, including uncontrolled burn through, while eliminating completely the need for gas or electric radiant heat and superheated blown air in sealing carton bottom closures. Providing such apparatus for use in closing the bottom closures of thermoplastic double coated paperboard containers such as polyethylene double coated paperboard cartons eliminates altogether the need for gas or electric radiant heat and superheated blown air in the packaging of liquids as, for example, in the packaging of milk and other dairy products.

BRIEF DESCRIPTION OF THE INVENTION

Apparatus for ultrasonically sealing the bottom closure of thermoplastic double coated paperboard containers such as polyethylene double paperboard cartons comprises a substantially conventional bottom closure folding machine which is equipped with an ultrasonic vibrator and sealing horn arrangement and a multi-surface mandrel pad and a drive means for urging the sealing horn and multisurface mandrel pad into forcible engagement.

The sealing horn comprises a body portion surmounted by a face having a recessed portion and a raised portion. The raised portion of the face defines the pattern of the bottom closure seal and is preferably knurled to improve the transmission of vibratory motion from the ultrasonic vibrator and sealing horn to the sealing area of the folded carton bottom closure.

The surfaces of the multi-surface mandrel pad are shaped and recessed to receive portions of the tabs and panels of the carton bottom closure when folded. The surfaces are preferably parallel to one another lying in at least two distinct planes. The surfaces are bounded by a series of substantially vertical walls and separated by distances preferably equal to an integral multiple of the thickness of the paperboard used for the thermoplastic double coated paperboard container whose bottom closure is to be sealed. At least one surface lies in the outer-most plane to receive and engage portions of the folded carton bottom closure comprising a single thickness of thermoplastic double coated paperboard. At least one other surface is recessed from the outer surface by an integral multiple of the thickness of the paperboard used for the thermoplastic double coated paperboard container, surfaces recessed by one such thickness receive and engage portions of the bottom closure comprising two laminates of thermoplastic double coated paperboard and surfaces recessed by N such thicknesses (where n is an integer) receive and engage respectively portions of the bottom closure comprising N+1 laminates of thermoplastic double coated paperboard.

To form the bottom seal, the carton blank is inserted on the multi-surface mandrel pad, whose body peripheral shape is substantially that of the interior of the tubular body of the carton, causing the carton blank to assume its tubular shape with the outer most surface of the multisurface mandrel pad directed toward the bottom closure end of the tubular shaped unfolded carton blank. The bottom closure is then crimped and folded in a conventional manner by means of a crimping and folding plow into its closed or sealing position. As the bottom closure is folded, portions of the infolded tabs and panels of the bottom closure are received and engaged by the multiplicity of surfaces of the multi-surface mandrel pad in accordance with their respective shapes and laminate thicknesses as described above. This operation gives rise to a substantially flat outer surface for engaging the raised portion of the sealing horn face with a uniform force.

After folding, the sealing horn is caused to vibrate ultrasonically by the ultrasonic vibrator and urged by the bottom closure folding machine drive means into forcible engagement with the mandrel pal which is enshrouded by the folded carton. The folded carton bottom closure is sandwiched between the sealing horn and the multi-surface mandrel pad. That portion of the bottom closure between the multi-surface mandrel pad and the raised portion of the sealing horn face is caused to vibrate ultrasonically for a short interval of time causing the thermoplastic of adjoining thermoplastic double coated paperboard surfaces of that portion to combine and flow together. The ultrasonic vibrator is then stopped and the sealing horn and multi-surface mandrel pad are held in forcible engagement while the combined thermoplastic is allowed to return to its solid state forming a liquid-tight seal between adjoining laminates throughout the area defined by the raised portion of the sealing horn face. Thereafter, the sealing horn and multi-surface mandrel pad are separated and the bottom sealed carton is withdrawn from the mandrel pad.

The raised portion of the sealing horn face conforms in shape substantially to the shape of the folded edges and overlapping portion of the carton bottom closure tabs and panels in their folded position. This step forms a carton bottom closure ultrasonic seal along all critical edges and overlapping portions to insure a leak-proof bottom seal. The carton bottom closure tabs and panels which are not sandwiched between the raised portion of the sealing horn face and the multi-surface mandrel pad are kept from excessive ("burn through") vibration by the damping resulting from their engagement with respective surfaces of the multisurface mandrel pad. Irregularities in the bottom seal are avoided by the effects of the recessed surfaces of the multi-surface mandrel pad which receive varying thicknesses of the infolded carton bottom closure tabs and panels, thereby presenting a substantially "flat" plane for forcible engagement with the sealing horn. The presentation of a substantially "flat" plane results in an approximately uniform engaging force throughout that portion of the bottom closure sandwiched between the raised portion of the sealing horn face and the multi-surface mandrel pad.

After sealing, the carton is removed from the multi-surface mandrel pad to be filled and finally sealed at its top opening. To facilitate carton removal from the mandrel pad, the various surfaces and side walls of the multi-surface mandrel pad are vented. This venting permits air to enter the area between the sealed bottom closure and the surfaces of the multi-surface mandrel pad after sealing to eliminate vacuum suction which might otherwise result during carton removal.

Thus, it is a primary object of the present invention to provide apparatus for sealing the bottom closure of thermoplastic double coated paperboard containers such as polyethylene double coated paperboard cartons without the use of gas or electric radiant heat and superheated blown air.

It is another object of the present invention to provide a sealing horn and multi-surface mandrel pad for use with an ultrasonic vibrator and a conventional bottom closure folding machine having a drive means to ultrasonically seal the bottom closure of thermoplastic double coated paperboard containers.

It is a further object of the present invention to provide a sealing horn having a face with a recessed portion and a raised portion, the raised portion for forcibly engaging and causing a portion of the bottom closure to vibrate at ultrasonic frequencies thereby forming a liquid-tight seal over critical predetermined areas of the carton bottom closure.

It is still another object of the present invention to provide a multi-surface mandrel pad for receiving and engaging tabs and panels of the folded bottom closure of a thermoplastic double coated container to present a flat surface for engaging the raised portion of the sealing horn face with uniform force and for dampening excessive extraneous vibration of those portions of the bottom closure tabs and panels which are not engaged with the raised portion of the sealing horn face thereby preventing burn through.

It is yet another object of the present invention to provide a multi-surface mandrel pad which is vented to permit air to enter the area between the carton bottom closure and the surfaces of the multi-surface mandrel pad after sealing to facilitate removal of the bottom sealed carton from the multi-surface mandrel pad.

These and other objects, advantages and features of the present invention will be apparent from the following description of the invention, an exemplary and preferred embodiment of which is illustrated in the appended drawings.

DESCRIPTION OF THE DRAWINGS

FIG. 5 is a top plan view of the multi-surface mandrel pad of the present invention.

FIG. 6 is a top plan view of the face of the sealing horn of the present invention.

FIG. 11 is a pictorial breakaway view of the sealing horn, bottom sealed carton and multi-surface mandrel pad after sealing during removal of the carton.

FIG. 12 is a cross sectional view of the FIG. 13 arrangement in the forcible engagement position taken along line 41—41 (FIG. 11) showing the folded carton bottom closure sandwiched between the sealing horn and the multisurface mandrel pad.

FIG. 13 is a pictorial breakaway view of the sealing horn face and the outer surface of the carton bottom closure after ultrasonic sealing.

FIG. 14 is a pictorial view of the multi-surface mandrel pad and a breakaway of the inner surface of the carton bottom closure after ultrasonic sealing.

FIG. 15 is a top plan view of the inner surface of the carton bottom closure after ultrasonic sealing.

FIG. 16 is a top plan view of the outer surface of the carton bottom closure after ultrasonic sealing.

DETAILED DESCRIPTION OF THE INVENTION

Figure 1:
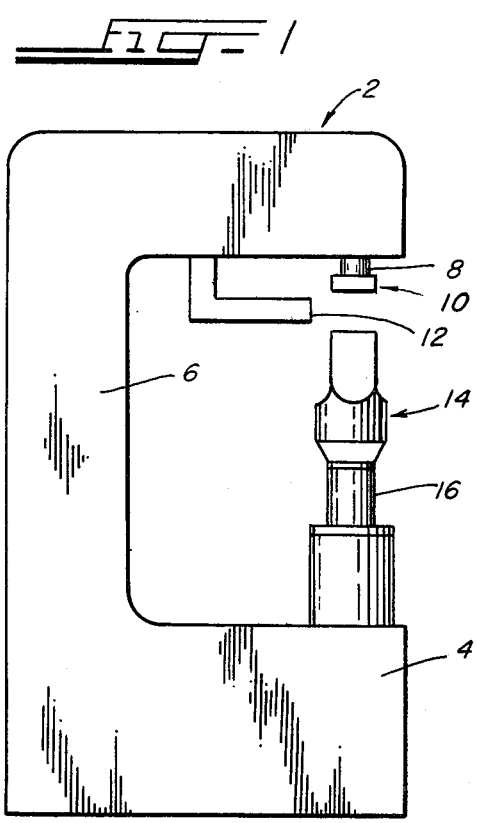
FIG. 1 is a symbolic illustration of a right profile view of a bottom closure folding machine and the apparatus of the present invention.

Referring to FIG. 1, bottom closure folding machine 2 is illustrated symbolically as comprising base 4, support 6, supporting mandrel 8, and multi-surface mandrel pad 10 in operable association with crimping and folding plow 12. Sealing horn 14 and drive means 16 are positioned vertically directly below multi-surface mandrel pad 10 such that following crimping and folding which is done in a conventional fashion by crimping and folding plow 12 (shown symbolically in block form), drive means 16 drives sealing horn 14 into forcible engagement with multi-surface mandrel pad 10, which is enshrouded by the carton after crimping and folding, for sealing.

Figure 2:
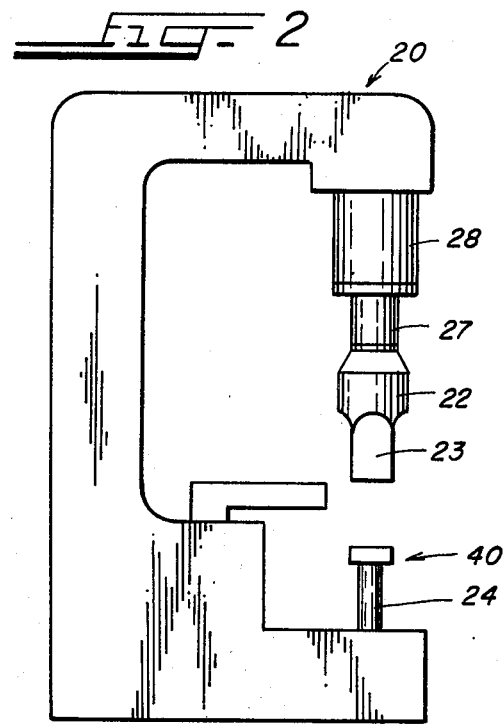
FIG. 2 is a symbolic illustration of a right profile view of a bottom closure folding machine and the apparatus of the present invention inverted from that shown in FIG. 1.

With reference to FIG. 2, bottom closure folding machine 20, illustrated symbolically, is similar in function and form to bottom closure folding machine 2 (FIG. 1) except that the vertical orientation of sealing horn 22, supporting mandrel 24 and multi-surface mandrel pad 40 are inverted vertically with respect to sealing horn 14, supporting mandrel 8 and multi-surface mandrel pad 10 (FIG. 1).

Figure 3:
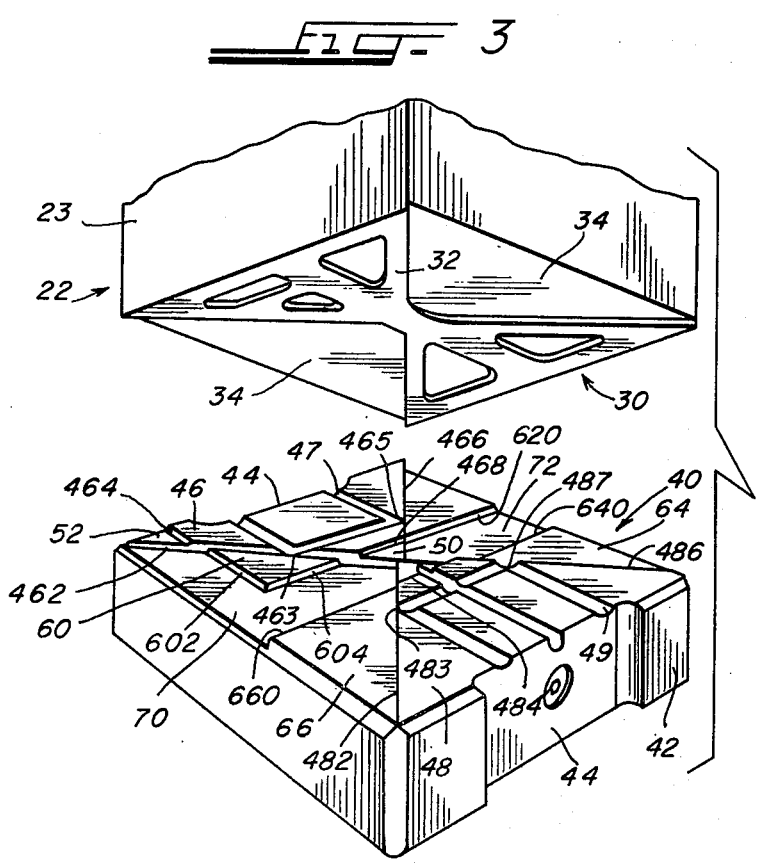
FIG. 3 is an enlarged pictorial view of the end portions respectively of the sealing horn and multi-surface mandrel pad of the apparatus of the present invention with the orientation shown in FIG. 2.

Referring to FIG. 3, and maintaining consistent numbering of common elements for FIGS. 2–16, sealing horn 22 comprises body portion 23 and sealing horn face 30 and is positioned vertically directly above multi-surface mandrel pad 40. Sealing horn face 30 comprises raised portion 32 and recessed portion 34, shown more clearly in FIG. 6. Multi-surface mandrel pad 40 comprises body portion 42, air vents 44 and a multiplicity of surfaces hereinafter described and shown in detail in FIG. 5.

Figure 4:
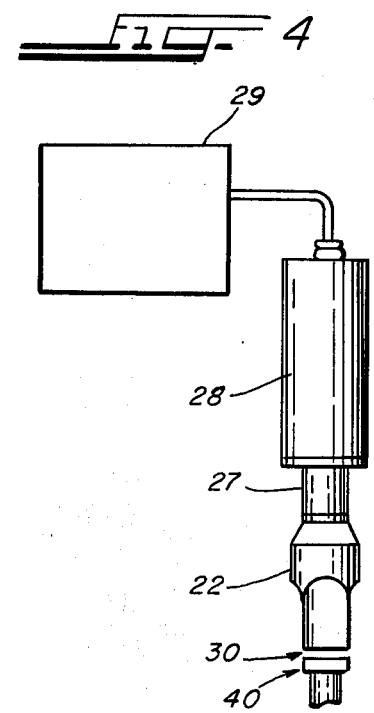
FIG. 4 is a right profile of the ultrasonic vibrator, drive means, sealing horn and multi-surface mandrel pad arrangement of apparatus of the present invention with the FIG. 2 orientation.

With reference to FIG. 4, the apparatus of the present invention, suited for use with virtually any type bottom closure folding machines symbolically illustrated in FIGS. 1 and 2, comprises sealing horn 22 operably connected to drive means 27 and ultrasonic vibrator 28 such that the sealing horn face 30 of sealing horn 22 is directed to forcibly engage the multiplicity of surfaces of multi-surface mandrel pad 40 after conventional crimping and folding operations when drive means 27 is energized. Ultrasonic vibrator 28 and drive means 27 are controlled by conventional power and timing means shown as control pack 29.

With reference to FIGS. 3 and 5, to receive portions of the tabs and panels of the carton bottom closure when folded, multi-surface mandrel pad 40 is surmounted by a multiplicity of surfaces comprising outer surfaces 46 and 48, outer surface 46 bounded by walls 462, 464, 466, 468, and outer surface 48 bounded by walls 482, 484, 486. Outer surfaces 46 and 48 define respectively air grooves 47 and 49, air groove 47 being machined to intersect walls 462 and 466 respectively at wall segments 463 and 465 and air groove 49 being machined to intersect walls 482, 484, and 486 respectively at wall segments 483, 485, and 487.

Multi-surface mandrel pad 40 (FIGS. 3 and 5) further comprises second surfaces 50 and 52. Second surface 50 is recessed from outer surfaces 46 and 48 by a distance less than the thickness of the thermoplastic double coated paperboard material used in fabricating the carton to be sealed and preferably equal to the paperboard thickness and comprises that surface bounded by walls 462, 466, 468, 482, 484 and 486. Second surface 52 is also recessed from outer surfaces 46 and 48 by a distance less than the thickness of the carton material and preferably equal to the paperboard thickness and comprises that surface bounded by walls 462 and 464. As shown in FIG. 5, surfaces 46 and 48 and second surface 52 are bounded at their outer extremities by air vents 44 and section of the peripheral sides of body portion 42 of multi-surface mandrel pad 40.

With further reference to FIGS. 3 and 5, multi-surface mandrel pad 40 additionally comprises third surfaces 60, 62, 64, and 66 which are recessed from outer surfaces 46 and 48 by a distance less than twice the thickness of the thermoplastic double coated carton material of the carton to be sealed and preferable equal to twice the paperboard thickness. Third surface 60 lies between wall 462 and walls 602 and 604 and third surface 62 lies between wall 466 and wall 620. Third surface 64 lies between wall 486 and wall 640 and third surface 66 is bounded by walls 482 and 660. As shown, third surfaces 62, 64, and 66 are bounded at their outer extremities by sections of the peripheral sides of multi-surface mandrel pad 40 body portion 42. Finally multi-surface mandrel pad 42 comprises fourth surfaces 70 and 72 which are recessed from outer surfaces 46 and 48 by a distance less than three times the thickness of the thermoplastic double coated carton material and preferably equal to three times the paperboard thickness.

Cumulatively, outer surfaces 46 and 48 coupled with second, third, and fourth surfaces respectively 50 and 52, 60, 62, 64 and 66, and 70 and 72 comprise a topographical relief pattern corresponding to laminate thicknesses of the tabs and panels of the bottom closure of a conventional milk carton in its folded position. The distance by which adjacent surfaces are separated is preferably the thickness of the paperboard of the thermoplastic double coated paperboard material used in fabricating the carton to be sealed, i.e., the thickness of the thermoplastic double coated paperboard less the combined thickness of the thermoplastic coatings. Adjacent outer, second, third and fourth surfaces respectively 46 and 48, 50 and 52, 60, 62, 64, and 66, and 70 and 72 of the multiplicity of surfaces of multisurface mandrel pad 40 are separated by distances approximately equal to intergral multiples of carton paperboard thicknesses thereby permitting the relatively thin coatings of thermoplastic of adjoining layers to be combined in areas of ultrasonic vibratory motion. The thermoplastic double coated paperboard customarily used for one quart size milk cartons, for example, is composed of paperboard approximately 18 mils (18 thousandths of an inch) thick coated on both sides with a polyethylene layer between 0.5 mils and 1.0 mils thick. Thus, in application of the present invention for sealing of one quart size milk cartons of the customary type, the distance between adjacent numbered surfaces is preferably 18 mills. In particular, for a multi-surface mandrel pad of the type disclosed herein for use in sealing thermoplastic double coated paperboard containers having paperboard thickness of 18 mils and coating thicknesses of between 0.5 and 1.0 mils, such as one quart size milk cartons, second surfaces 50 and 52 are preferably recessed from outer surfaces 46 and 48 by a distance equal to 18 mils, third surfaces 60, 62, 64 and 66 are separated from outer surfaces 46 and 48 by a distance of approximately 36 mills and fourth surfaces 70 and 72 are separated from outer surfaces 46 and 48 by a distance of approximately 54 mills. In all cases, adjacent numbered surfaces may be separated by some distance other than the carton paperboard thickness so long as the laminate thicknesses of the tabs and panels of the folded bottom closure are placed in compression throughout the area of raised portion 32 of sealing horn face 30 when sealing horn 22 and multi-surface mandrel pad 40 are in forcible engagement.

As will be explained more fully below, the multiplicity of surfaces of multi-surface mandrel pad 40 engage and receive sections of the tabs and panels of the folded carton bottom closure laminates such that the outer surface of the folded bottom closure is substantially flat to permit uniform forcible engagement thereof with the raised portion 32 of sealing horn face 30 (FIGS. 3 and 6) during the sealing process. The edges and corners of multi-surface mandrel pad 40 are flat beveled as shown to facilitate placement of the carton blank over the multi-surface mandrel pad although other forms of beveling may be used to achieve the same purpose.

With reference to FIG. 6, raised portion 32 of sealing horn face 30 is a continuous uniform surface comprising diagonal segments 82, 84, 86, and 88 and edge segments 90 and 92. In addition, raised portion 32 comprises side seam leg 94 and flap leg 95 which extends across sealing horn face 30 from edge segment 90 to edge segment 92. When positioned for engagement with multi-surface mandrel pad 40 as shown in FIG. 3, segments 82, 84, 86, 88, 90 and 92 and legs 94 and 95 of raised portion 32 of sealing horn 30 have a corresponding relationship to the various walls separating the multiplicity of surfaces of multi-surface mandrel pad 40. In particular, it will be seen that when sealing horn 22 and multi-surface mandrel pad 40 are positioned for forcible engagement as shown in FIG. 3, diaganol segments 82, 84, 86 and 88 of raised portion 32 have a corresponding relationship with walls 462, 466, 482 and 486. Similarly, side seam leg 94 has a corresponding relationship with wall 602. When positioned for engagement with multi-surface mandrel pad 40, flap leg 95 of raised portion 32 is positioned to correspond with second surface 50 and portions of fourth surfaces 70 and 72. Similarly, edge segments 90 and 92 are positioned to extend across respectively the outer extremities of third surface 66 and fourth surface 70 and the outer extremities of third surfaces 62 and 64 and fourth surface 72. The described positional correspondence between the segments and legs of raised portion 32 and the various walls and surfaces of multi-surface mandrel pad 40, permits the ultrasonic sealing or joining of sections of the tabs and panels of the folded bottom closure such that the bottom closure is sealed to the flow of liquids. It will be understood that the shape and form of raised portion 32 of sealing horn face 30 corresponds to the particular arrangement of surfaces and walls of multi-surface mandrel pad 30 and that the shape and form of raised portion 32 may require change with changes in multi-surface mandrel pad 40.

With reference to FIGS. 7 through 10, in operation carton blank 100 is inserted over multi-surface mandrel pad 40 such that the outer surfaces 46 and 48 of multi-surface mandrel pad 40 are substantially in the plane including both bottom closure score lines 102 and 104 with the outer extremity of second surface 52 adjacent the surface 106 of side seam tab 108. With multi-surface mandrel pad 40 thus positioned within carton blank 100, carton blank 100 assumes its tubular shape (FIG. 7) and is crimped and folded in the steps illustrated in FIGS. 8 and 9 by means of a conventional crimping and folding plow to its closed position illustrated in profile in FIG. 10.

Figure 7:
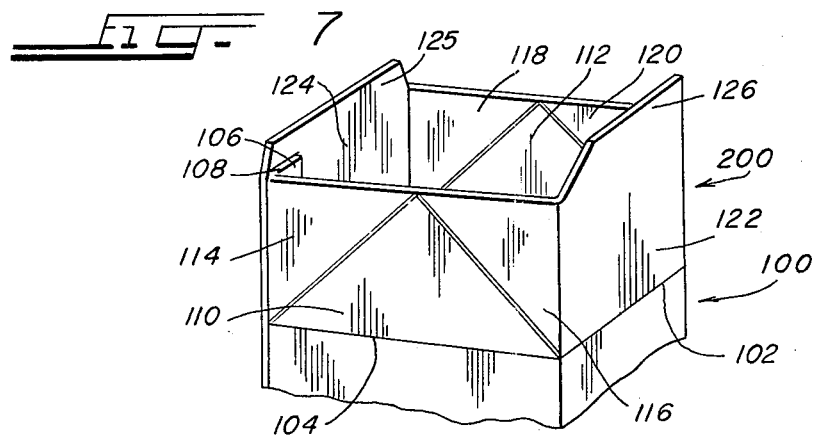
FIG. 7 is a pictorial view of the carton bottom closure after insertion of the carton blank over the multisurface mandrel pad.
Figure 8:
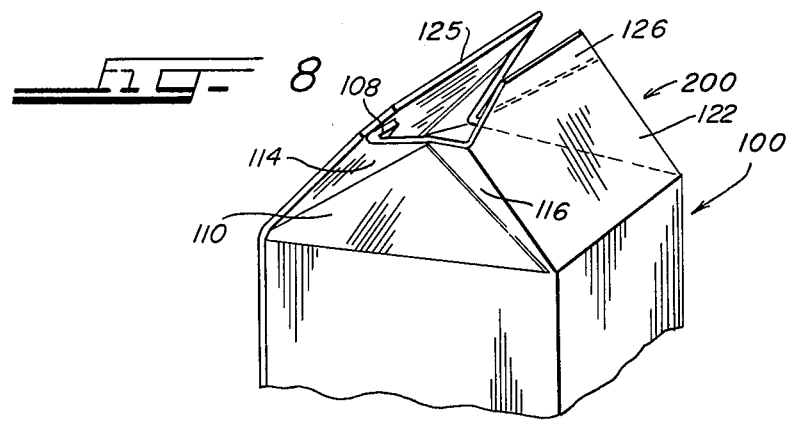
FIG. 8 is a pictorial view of the carton bottom closure after crimping during folding.
Figure 9:
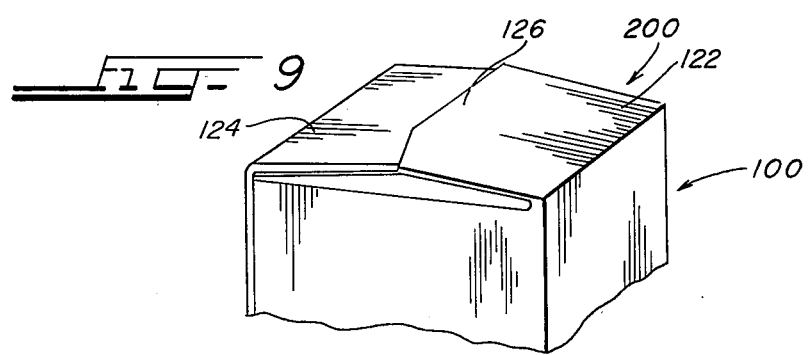
FIG. 9 is a pictorial view of the carton bottom closure after folding.
Figure 10:
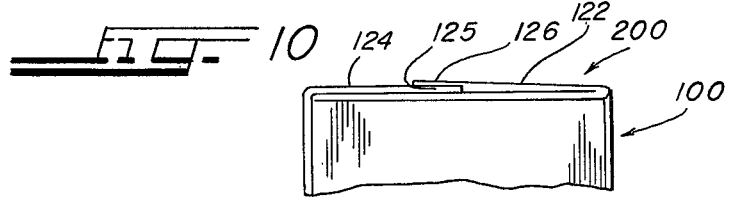
FIG. 10 is a right profile of the carton bottom closure just prior to sealing.

Referring to FIGS. 5, 7, and 8, as the bottom closure 200 of carton blank 100 is crimped and folded, first triangular panel 110 is received and engaged by that portion of multi-surface mandrel pad 40 bounded by walls 462 and 482. Similarly, triangular panel 112 is received and engaged for that portion of multi-surface mandrel pad 40 bounded by walls 466 and 486. As the bottom closure 200 of carton blank 100 is crimped and folded toward its closed position, triangular fold-in panels 114 and 116 assume a position immediately above triangular panel 110 while triangular fold-in panels 118 and 120 assume a position immediately above triangular panel 112. Triangular panels 110 and 112 are also surmounted by bottom closure 200 main panels 122 and 124 are also positioned over triangular panels 110 and 112 as folding is completed. As a consequence of overlapping of panels to form the bottom closure as described, the laminate thickness of that portion of the bottom closure 200 lying above the multi-surface mandrel pad 40 area bounded by walls 462 and 482 and that portion bounded by walls 466 and 486 will be at least three layers thick. Accordingly, that portion of multi-surface mandrel pad 40 is recessed from outer surface 46 and 48 by at least a distance somewhat less than two times the thickness of the thermoplastic double coated paperboard of the container being sealed.

With further reference to FIGS. 5 and 7, as bottom closure 200 of carton blank 100 is folded to its closed position, that portion of bottom closure 200 lying above triangular panels 110 and 112 which corresponds to side seam tab 108 and portions of overlapping flap 126 and tuck-in flap 125 will have a folded laminate thickness equal to four times the thickness of the thermoplastic double coated paperboard container material. Accordingly, the surfaces 70 and 72 are recessed from outer surfaces 46 and 48 by a distance less than three times the thickness of the container material. Second surface 52 of multi-surface mandrel pad 40 receives and engages that portion of side seam tab 108 which is not positioned above triangular panel 110 when carton bottom closure is folded. Similarly, second surface 50 receives and engages those portions of overlapping flap 126 and tuck-in flap 127 which are not positioned above triangular panels 110 and 112 in the folded position shown in FIG. 10. Those portions of main panels 122 and 124 which do not lie above triangular panels 110 and 112 and side seam tab 108 are engaged respectively by outer surfaces 48 and 46.

Referring to FIGS. 11, 12 and 13, after the bottom closure 200 has been crimped and folded into its closed position, sealing horn 22 is caused to ultrasonically vibrate by ultrasonic vibrator 28 (FIG. 4) and urged by drive means 27 into forcible engagement with multi-surface mandrel pad 40. During forcible engagement, the bottom closure tabs and panels are sandwiched in compression between the sealing horn face 30 and the multiplicity of surfaces surmounting multi-surface mandrel pad 40 (see FIG. 12). That portion of the bottom closure sandwiched between raised portion 32 of sealing horn face 30 and multi-surface mandrel pad 40 is caused to ultrasonically vibrate by the vibratory motion of sealing horn 22. The transmission of ultrasonic vibratory motion from the raised portion 32 of sealing horn face 30 is improved by knurling the surface of raised portion 32 thereby avoiding slippage between the outer surface 204 of bottom closure 200 and raised portion 32 of sealing horn face 30. The ultrasonic vibration causes the thermoplastic double coating of that portion of bottom closure 200 sandwiched between raised portion 32 and multi-surface mandrel pad 40 to soften or liquify and the continuous force acting to urge sealing horn 22 into engagement with multi-surface mandrel pad 40 forces the thermoplastic coating of adjoining surfaces to unite or combine with the thermoplastic coatings of the adjoining portions of tabs and panels in the area defined by raised portion 32. After a short interval of time, ultrasonic vibrator 28 is de-energized causing sealing horn 22 to stop vibrating and the bottom closure is held in its sandwiched position under force in compression for a period of time sufficient to allow the thermoplastic double coating of those portions of bottom closure 200 between the raised portion 32 of sealing horn face 30 and multi-surface mandrel pad 40 to assume its firm or solid state creating a liquid-tight seal or bond between those adjoining surfaces. The period during which the sealing horn 22 must be ultrasonically vibrated during forceable engagement with the multi-surface mandrel pad 40 varies with the thickness of paperboard in the thermoplastic double coated paperboard container material from which the container being sealed is fabricated. The period of ultrasonic vibrating must be increased as paperboard in the thermoplastic double coated paperboard carton material is increased in thickness. For cartons fabricated of paperboard with a thickness of 18 mills (coating thicknesses of between 0.5 mil and 1 mill), an ultrasonic vibratory period of between 0.2 and 2 seconds has been found satisfactory to create a liquid-tight bottom seal. It is believed a vibratory period of not more than three seconds will suffice for all presently used thermoplastic double coated containers. The interval following vibratory motion of the sealing horn during which the bottom closure must be held in its sandwiched position under compression also varies with the thickness of the thermoplastic double coated paperboard of the carton being sealed. The necessary holding time also increases with increasing paperboard thickness. For a carton fabricated of 18 mill paperboard with 0.5 mil to 1 mil thermoplastic coatings, a waiting period of between 0.2 seconds and 2 seconds has been found satisfactory.

With reference to FIG. 11, after ultrasonic sealing, sealing horn 22 is withdrawn from forcible engagement with multi-surface mandrel pad 40 and bottom seal carton blank 100 is withdrawn from multi-surface mandrel pad 40 to be filled and subsequently sealed at its top closure.

Referring to FIG. 13 and 14, during sealing the forcible engagement between sealing horn 22 and multi-surface mandrel pad 40 acts to force sections of the panels and tabs of bottom closure 200 into the multiplicity of surfaces of multi-surface mandrel pad 40 so that the inner surface 202 of bottom closure 200 assumes substantially the topographical shape of the multiplicity of surfaces of multi-surface mandrel pad 40. With the panels and tabs of bottom closure 200 forced into the multiplicity of surfaces of multi-surface mandrel pad 40, the outer surface 204 of bottom closure 200 is substantially flat and, as a consequence, the force exerted on bottom closure 200 outer surface 204 by engagement of raised portion 32 of sealing horn face 30 is substantially uniform throughout the area of the ultrasonic seal 206 thereby minimizing or avoiding sealing inconsistencies and gradients. With the panels and tabs of the overall inner-surface 202 of bottom closure 200 received and engaged by the multiplicity of surfaces of multi-surface mandrel pad 40, unwanted burn through and uncontrolled ultrasonic vibration of sections of bottom closure 200 not forcibly sandwiched between the raised portion 32 of sealing horn face 30 and multi-surface mandrel pad 40 is prevented by the vibration damping effects inherent in that surface engagement.

Referring to FIGS. 12 and 14, the removal of bottom sealed carton blank 100 is facilitated by air vents 44, and air grooves 47 and 49 which permit air to enter the sealed cavity created during sealing between bottom closure 200 and the multiplicity of surfaces of multi-surface mandrel pad 40. In particular, air is allowed to enter the area 101 between carton blank 100 and supporting mandrel 24 and pass through air vents 44, and air grooves 47 and 49 as shown by arrows in FIGS. 12 and 14 thereby avoiding vacuum suction which may otherwise occur and prevent or inhibit withdrawal of bottom sealed carton blank 100 from multi-surface mandrel pad 40.

Referring to FIGS. 15 and 16, the inner surface 202 of botton closure 200 (FIG. 15) after sealing shows the final positional relationship among triangular panels 110 and 112, bottom panels 122 and 124, side seal tab 108 and tuck-in flat 125. The ultrasonic seal 206 (FIG. 16) appearing on outer surface 204 of bottom closure 200 extends the full length of edges 208 and 210 and diagonally toward the central area from all four corners of bottom closure 200. In addition, ultrasonic seal 206 extends from edge 208 to edge 210 over overlapping flap 126 and also from overlapping flap 126 over the edge of side seam tab 108 (not shown) situated immediately below main panel 124 thereby creating a liquid-tight leakproof ultrasonic seal at bottom closure 200 of carton blank 100.

It will be understood that the present invention is not restricted to application or use in connection with the type of machines symbolically illustrated in FIGS. 1 and 2, and that indeed the present invention may be used in machines having sliding and rotating sealing horns and mandrel pads and in machines having a plurality of sealing horns and mandrel pads without departing from the spirit and scope of the present invention.

It will further be understood that the preferred embodiment disclosed and illustrated in the drawings appended hereto illustrates but one of a multitude of possible sealing horn raised portion patterns and surface patterns for a multi-surface mandrel pad, the raised portion of the sealing horn and the shape and recess topographical pattern of the multi-surface mandrel pad being functions of the particular bottom closure being sealed and of the folding pattern of the bottom closure being sealed.

It will be appreciated that the apparatus disclosed as an exemplary preferred embodiment may be modified, varied or changed to accommodate any bottom closure folding configuration or top closure folding configuration in the apparatus illustrated is not restricted to carton closures having four differing thicknesses.

It should be expressly understood that various modifications, variations, and changes in the structure of the embodiment illustrated herein may be made without departing from the scope and spirit of the present invention as defined in the appended claims wherein I claim:

1. Apparatus for use with a bottom closure folding machine for sealing the bottoms of paperboard cartons composed of foldable thermoplastic double coated material, comprising:
   a first means for sealing, said first sealing means having a body portion and a face with a raised portion and a recessed portion;
   a second means for sealing, said second sealing means for forcibly engaging said first sealing means, said second sealing means having a multiplicity of surfaces separated from one another by walls, said multiplicity of surfaces lying in at least two distinct planes and shaped for receiving infolded panels of a folded carton bottom closure so that the force applied to the outer surface of the folded carton bottom closure during forcible engagement of said first sealing means and said second sealing means is substantially uniform over a selected area of the folded carton bottom closure;
   an ultrasonic vibrator for creating ultrasonic vibration which is transmitted to said selected area of the folded carton bottom closure during a portion of the period of forcible engagement between said first sealing means and said second sealing means to create an ultrasonic seal over said selected area of the folded carton bottom closure; and
   a drive means for urging said first sealing means and said second sealing means into forcible engagement during the sealing operation.

2. Apparatus for sealing cartons as claimed in claim 1 wherein said raised portion of the face of said first sealing means comprises a pattern of segments and legs which lie substantially parallel with and substantially above the walls separating said multiplicity of surfaces of said second sealing means when said first sealing means is positioned to forcibly engage said second sealing means.

3. Apparatus for sealing cartons as claimed in claim 1 wherein the raised portion of said face of said first sealing means is knurled to improve its ultrasonic sealing ability.

4. Apparatus for sealing cartons as claimed in claim 1 wherein certain of said surfaces of said second sealing means define air grooves through which air is allowed to pass to cavities formed between the sealed carton bottom and the second sealing means during removal of the sealed carton from the second sealing means after sealing.

5. Apparatus for sealing cartons as claimed in claim 1 wherein the multiplicity of surfaces of said second sealing means lie in substantially parallel planes separated by integral multiples of the thickness of paperboard used in the carton being sealed.

6. Apparatus for sealing cartons as claimed in claim 1 wherein said drive means is connected to said first sealing means for urging said first sealing means into forcible engagement with said second sealing means enshrouded by the folded carton.

7. Apparatus for sealing cartons as claimed in claim 1 wherein said drive means urges said first sealing means and said second sealing means into forcible engagement for a predetermined interval of time in response to an external signal.

8. Apparatus for sealing cartons as claimed in claim 7 wherein said ultrasonic vibrator is caused to vibrate for a predetermined interval of time beginning prior to forcible engagement of said first sealing means and said second sealing means and ending a short time prior to separation of said first sealing means and said second sealing means.

9. Apparatus for sealing cartons as claimed in claim 8 wherein said ultrasonic vibrator is caused by said external signal to vibrate for an interval of time substantially less than the predetermined interval of time during which said first sealing means and said second sealing means are in forcible engagement.

10. Apparatus for use with a bottom closure folding machine for sealing cartons composed of foldable thermoplastic double coated material such as polyethylene double coated paperboard comprising:
    a sealing horn for ultrasonically sealing the carton, said sealing horn having a cylindrical body portion surmounted by a substantially cubical head having a rectangular face with a recessed portion and a knurled raised portion;
    a mandrel pad having a rectangular cross-section for forcibly engaging said sealing horn, said mandrel pad having primary and secondary surfaces separated by walls, said primary surfaces lying in first and second parallel planes, said secondary surfaces lying in third and fourth parallel planes, certain of said primary surfaces defining air grooves through which air is allowed to pass to cavities formed between the carton bottom closure and said mandrel pad during removal of the sealed carton from the mandrel pad after sealing;
    vibrator means connected to said sealing horn for vibrating said sealing horn at ultrasonic frequencies for a predetermined interval of time during the forcible engagement of said sealing horn and said mandrel pad enshrouded by the folded carton to create an ultrasonic seal over the area defined by the raised portion of said rectangular face of said sealing horn;
    drive means for urging said sealing horn and said mandrel pad into forcible engagement during the sealing process.

11. Apparatus for sealing cartons as claimed in claim 10 wherein said raised portion of said sealing horn comprises a contiguous series of adjoining elongated segments and legs which lie parallel to and substantially above the walls separating said primary surfaces and separating said secondary surfaces and above selected secondary surfaces during the forcible engagement of said sealing horn and said mandrel pad.

12. Apparatus for sealing cartons as claimed in claim 10 wherein said first parallel plane coincides with the outermost plane of said mandrel pad; said second parallel plane is parallel to but recessed from said first parallel plane by a distance less than the total thickness of the thermoplastic double coated material of the carton being sealed; said third parallel plane is recessed from said first parallel plane by a distance less than twice the thickness of the thermoplastic double coated carton material; and said fourth parallel plane is recessed from said first parallel plane by a distance less than three times the thickness of the thermoplastic double coated carton material.

13. Apparatus for sealing cartons as claimed in claim 12 wherein the distance between adjacent parallel planes is equal.

14. Apparatus for sealing cartons as claimed in claim 10 wherein the edges and corners of said mandrel pad are beveled to facilitate its insertion into the unfolded carton blank and to facilitate the inward folding of bottom closure tabs and panels prior to sealing.

15. Apparatus for use with a bottom closure folding machine for sealing cartons composed of foldable thermoplastic double coated material such as polyethylene double coated paperboard comprising:

a sealing horn having a body portion surmounted by a head having a face with a recessed portion and a knurled raised portion, said knurled raised portion comprising a series of segments and legs whose center lines lie substantially coincident during sealing with certain of the folded edges and overlaping portions of the carton bottom closure after folding;

a mandrel pad having a body portion surmounted by a face for forcibly engaging said sealing horn during sealing, said face having a multiplicity of recesses corresponding substantially to the contour of the inner surface of the carton bottom closure after folding, said multiplicity of recesses for receiving and engaging portions of the folded bottom closure tabs and panels of varying thicknesses thereby leaving exposed for forcible engagement with said sealing horn a surface which can be pressed into a substantially flat position by the forcible engagement of said sealing horn and said mandrel pad;

vibrator means for ultrasonically vibrating said sealing horn to cause the thermoplastic coatings of adjoining sections of the carton bottom closure held in compression by the forcible engagement of said sealing horn and said mandrel pad to combine to form an ultrasonic seal;

drive means for urging said sealing horn and said mandrel pad into forcible engagement after said vibrator means initiates ultrasonic vibrating of said sealing horn and holding said sealing horn and said mandrel pad in forcible engagement for a period of time after said vibrator means has ceased vibrating said sealing horn.

16. Apparatus for sealing cartons as claimed in claim 15 wherein said vibrator means is connected to and ultrasonically vibrates said sealing horn for a limited period of time beginning before forcible engagement of said sealing horn and said mandrel pad and continuing for a short period of time after forcible engagement of said sealing horn and said mandrel pad.

17. Apparatus for sealing cartons as claimed in claim 16 wherein said drive means is connected to said vibrator means for urging said sealing horn against said mandrel pad.

18. Apparatus for sealing cartons as claimed in claim 16 wherein said drive means is connected to said mandrel pad for urging said mandrel pad against said sealing horn.

19. Apparatus for sealing cartons as claimed in claim 15 wherein said vibrator means is connected to and ultrasonically vibrates said mandrel pad for a limited period of time during the forcible engagement of said sealing horn and said mandrel pad.

20. Apparatus for sealing cartons as claimed in claim 19 wherein said drive means is connected to said mandrel pad for urging said mandrel pad against said sealing horn.

21. Apparatus for sealing cartons as claimed in claim 19 wherein said drive means is connected to said sealing horn for urging said sealing horn against said mandrel pad.

22. Apparatus for use with a bottom closure folding machine for sealing thermoplastic double coated cartons such as polyethylene double coated paperboard cartons wherein a mandrel pad is inserted into the carton blank during the folding and sealing of the carton and said mandrel pad, enshrouded by said folded carton, is urged into forcible engagement with a sealing horn during the final sealing steps, comprising:

a mandrel pad having a body portion surmounted by a face portion, said face portion having first, second, third and fourth planar surfaces, said first planar surface having two co-planar constituents, the first constituent defining a trapezoidal plane, and the second constituent defining an irregular pentagonal plane, said second planar surface having two co-planar constituents, the first defining a triangular plane and the second constituent defining an irregular hexagonal plane, said third planar surface having four co-planar triangular constituents and said fourth planar surface having two co-planar constituents, the first constituent defining an irregular heptagonal plane and the second constituent defining an irregular pentagonal plane;

a sealing horn having a body portion and a face with a raised portion and a recessed portion, said raised portion comprising a series of segments and legs whose shape substantially coincides with the pattern formed by the edges of said first, second, third and fourth planar surfaces and a portion of the surface of said second constituent of said second planar surface and a portion of the surface of the first and second constituents of said fourth planar surface;

an ultrasonic vibrator for creating ultrasonic vibration which is imparted to portions of the carton bottom closure;

a drive means for urging said mandrel pad and said sealing horn together during sealing.

23. Apparatus for sealing cartons as claimed in claim 22 wherein said first, second, third and fourth planar surfaces of said mandrel pad are parallel with one another, adjacent planar surfaces being separated by an integral multiple of a distance slightly less than the thickness of the material of which the thermoplastic double coated carton is composed.

24. Apparatus for sealing cartons as claimed in claim 22 wherein said first and said third planar surfaces of said mandrel pad are separated by a distance slightly less than two times the thickness of the carton material, said third planar surface for receiving and engaging triple laminate portions of the folded carton bottom closure, said first and said fourth planar surfaces are separated by a distance slightly less than three times the thickness of the carton material, said fourth planar surface for receiving and engaging quadruple laminate portions of the folded carton bottom closure, said first and said second planar surfaces separated by a distance slightly less than one thickness of the carton material, said second planar surface for receiving and engaging double laminate portions of the folded carton bottom closure, said first planar surface for engaging single layer portions of the folded carton bottom closure.

25. Apparatus for sealing cartons as claimed in claim 23 wherein the distance slightly less than the thickness of the carton material by which adjacent planar surfaces of said mandrel pad are separated is equal to the thickness of the thermoplastic double coated carton material less the sum of the thicknesses of the thermoplastic coatings of said carton material.

26. Apparatus for sealing cartons as claimed in claim 22 wherein the portion of said sealing horn in knurled to improve its ultrasonic sealing ability.

27. Apparatus for use with a bottom closure folding machine for sealing cartons composed of foldable thermoplastic double coated material such as polyethylene double coated paperboard comprising:

a sealing horn having a cylindrical body portion surmounted by a cubical head portion having a face with a recessed portion and a knurled raised portion, said knurled raised portion comprising a series of segments and legs whose center lines lie substantially coincident during sealing with certain of the folded edges and overlapping portions of the carton bottom closure after folding;

a mandrel pad having a body portion with a rectangular cross section surmounted by a rectangular face, said mandrel pad for forcibly engaging said sealing horn during sealing, said rectangular face having a multiplicity of recesses corresponding substantially to the contour of the inner surface of the carton bottom closure after folding, said multiplicity of recesses comprising first, second, third and fourth planar surfaces, said first planar surface having two co-planar constituents, the first constituent defining a trapezoidal plane and the second constituent defining irregular pentagonal plane, said second planar surface having two co-planar constituents, the first constituent defining a triangular plane and the second constituent defining an irregular hexagonal plane, said third planar surface having four co-planar triangular shaped constituents and said fourth planar surface having two co-planar constituents, the first constituent defining an irregular heptagonal plane and the second constituent defining an irregular pentagonal plane, said first, second, third and fourth planar surfaces lying parallel with one another such that adjacent planar surfaces are separated by an intergral multiple of a distance slightly less than the thickness of the material of which the thermoplastic double coated carton is composed, said multiplicity of recesses for receiving and engaging portions of the folded bottom closure tabs and panels of varying thicknesses thereby leaving exposed for forcible engagement with said sealing horn knurled raised portion a surface which can be pressed into a substantially flat position by the forcible engagement of said sealing horn raised portion and said mandrel pad such that a uniform force is exerted on the carton bottom closure throughout the area defined by the knurled raised portion of the face of said sealing horn;

vibratory means for ultrasonically vibrating said sealing horn to cause the thermoplastic coatings of adjoining sections of tabs and panels of the carton bottom closure lying between the knurled raised portion of said sealing horn and said multiplicity of recesses of said mandrel pad to combine to form an ultrasonic seal;

drive means for urging said sealing horn and said mandrel pad into forcible engagement after said vibrator means initiates ultrasonic vibrating of said sealing horn and holding said sealing horn and said mandrel pad in forcible engagement after said vibrator means has ceased vibrating said sealing horn for a period of time sufficient to permit the thermoplastic coatings combined in the ultrasonic sealing process to assume their rigid state.

28. Apparatus for sealing cartons as claimed in claim 27 wherein said vibrator means is connected to and ultrasonically vibrates said sealing horn for a period of time during forcible engagement of said sealing horn and said mandrel pad sufficient to create an ultrasonic seal between the thermoplastic coatings of adjoining sections of tabs and panels held in compression between the knurled raised portion of said sealing horn and said multiplicity of recesses of said mandrel pad.

29. Apparatus for sealing cartons as claimed in claim 28 wherein said period of time sufficient for causing an ultrasonic seal is between 0.2 and 3 seconds.

30. Apparatus for sealing cartons as claimed in claim 27 wherein said distance slightly less than the thickness of the material of which the thermoplastic double coated carton is composed comprises the thickness of the paperboard material used in fabricating the carton.

31. A method for ultrasonically sealing a prescored thermoplastic double coated container such as a polyethylene double coated paperboard carton comprising the steps of:

a. sliding the carton blank over a mandrel pad having a circumpheral shape substantially conforming to the interior wall shape of the carton to be sealed thereby shaping the carton;

b. crimping the carton closure to cause said carton to fold slightly along major score lines;

c. folding the carton closure to substantially its final closed position;

d. forcing portions of the interior surface of the folded carton closure into a multiplicity of planar recesses in said mandrel pad;

e. causing a sealing horn with a face having a raised portion and a recessed portion to vibrate ultrasonically;

f. pressing the folded carton closure between said mandrel pad and the raised portion of an ultrasonically vibrating sealing horn thereby softening the thermoplastic double coating of the carton material over the specific contact area defined by the raised portion of the sealing horn;

g. forcing the softened surfaces of adjoining laminates of the folded carton closure together causing the thermoplastic coatings of portions of adjoining tabs and panels to unite;

h. stopping the ultrasonic vibration of said sealing horn;

i. holding the folded carton closure in compression with portions of the folded carton closure within said multiplicity of surfaces of said mandrel pad until said softened thermoplastic coatings assume their hardened state;

j. removing the sealed carton from said mandrel pad.

* * * * *

UNITED STATES PATENT OFFICE
CERTIFICATE OF CORRECTION

Patent No. 3,971,300                     Dated July 27, 1976

Inventor(s) George L. Bachner

It is certified that error appears in the above-identified patent and that said Letters Patent are hereby corrected as shown below:

Column 1, line 23, "Carbon" should read --Carton--

Column 3, line 24, "pal" should read --pad--

Column 10, line 51, "botton" should read --bottom--

Column 10, line 53, "seal" should read --seam--

Signed and Sealed this

Twenty-third Day of November 1976

[SEAL]

Attest:

RUTH C. MASON
Attesting Officer

C. MARSHALL DANN
Commissioner of Patents and Trademarks